United States Patent [19]
Diamond et al.

[11] Patent Number: 5,167,829
[45] Date of Patent: Dec. 1, 1992

[54] SYSTEM FOR TREATING COMMERCIAL WASTE EFFLUENTS

[76] Inventors: Harold Diamond, 555 North Ave., Fort Lee, N.J. 07024; Thaddeus J. Kaniecki, 2 Van Alen Pl., Pompton Plains, N.J. 07444; Larry Rotter, 80 Tamarack Rd., Andover, N.J. 07821; Rudolph N. Vermes, 9 Foxwood La., Randolph, N.J. 07869

[21] Appl. No.: 718,731

[22] Filed: Jun. 21, 1991

[51] Int. Cl.$^5$ .................. C02F 1/52; B01D 17/04
[52] U.S. Cl. .................. 210/708; 210/752; 210/804; 210/DIG. 5
[58] Field of Search .............. 210/704, 708, 724, 728, 210/752, 802, 804, 806, DIG. 5, 749, 199, 202, 205, 221.2, 259, 307, 920, 201, 631

[56] References Cited

U.S. PATENT DOCUMENTS

| | | | |
|---|---|---|---|
| 3,080,315 | 3/1963 | Silvey | 210/752 |
| 3,577,341 | 5/1971 | Keith et al. | 210/726 |
| 3,707,464 | 12/1972 | Burns et al. | 210/724 |
| 3,883,429 | 5/1975 | Hanford | 210/202 |
| 3,951,795 | 4/1976 | Doncer et al. | 210/201 |
| 4,073,722 | 2/1978 | Grutsch et al. | 210/624 |
| 4,179,369 | 12/1979 | Bradley et al. | 210/708 |
| 4,198,294 | 4/1980 | Deane | 210/704 |
| 4,277,347 | 7/1981 | Pielkenrood | 210/704 |
| 4,278,545 | 7/1981 | Batutis et al. | 210/DIG. 5 |
| 4,698,163 | 10/1987 | Zibrida | 210/726 |
| 4,722,800 | 2/1988 | Aymong | 210/DIG. 5 |
| 4,790,943 | 12/1988 | Dunn et al. | 210/708 |

FOREIGN PATENT DOCUMENTS 53-9050 1/1978 Japan.

Primary Examiner—Stanley S. Silverman
Assistant Examiner—Christopher Upton
Attorney, Agent, or Firm—Salzman & Levy

[57] ABSTRACT

In accordance with the present invention, there is provided a system for treating commercial, industrial and institutional effluents to remove contaminants such as: fats, oils and greases, (FOGs) from the waste water. The system generally features a continuous processing treatment of the effluent, but can also be adapted on a small scale to a batch procedure. The system comprises the feeding of an emulsified waste stream to a first screening station, where solid matter and large particulates are removed. The FOGs in the waste stream are initially emulsified during the laundering or cleaning process by an alkaline detergent. The alkaline, emulsified waste stream is then fed to a first stage of a pH adjustment station. Here, the emulsified FOGs begin the process of being released and dispersed within the fluid, through the downward adjustment of the pH, i.e. by treating the effluent with acid. Finally, the dispersed emulsion stream is introduced into a separation station comprising either a separator, coalescer, clarifier or combination thereof. In the separation station, the fats, oils and grease, and any remaining solid waste is separated from the aqueous phase, syphoned off and/or pumped away. The waste water is now in condition to be discharged. Other processing can subsequently be done, such as environmental pH adjustments, or the removal of other contaminants such as heavy metals.

7 Claims, 2 Drawing Sheets

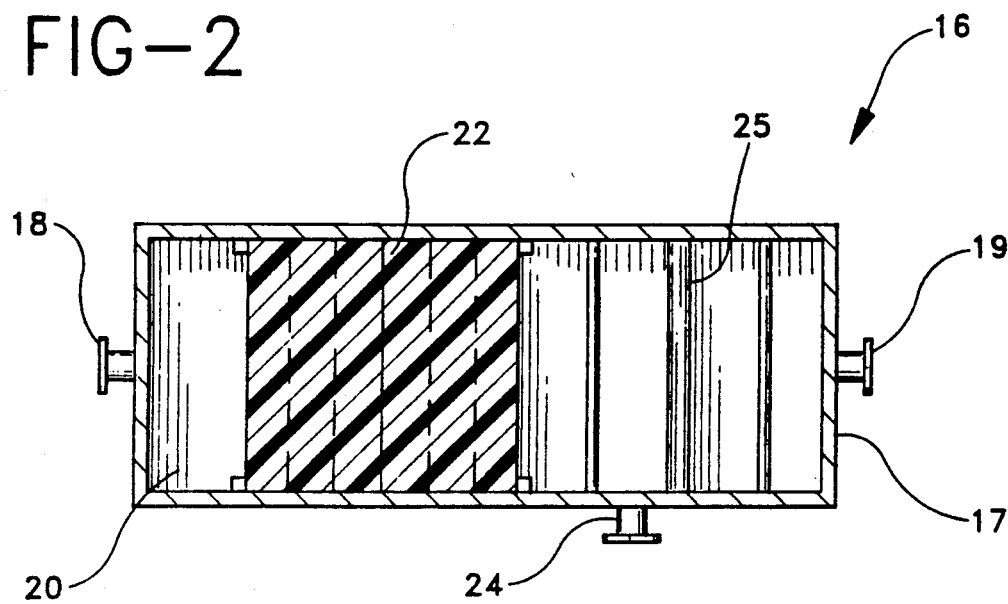
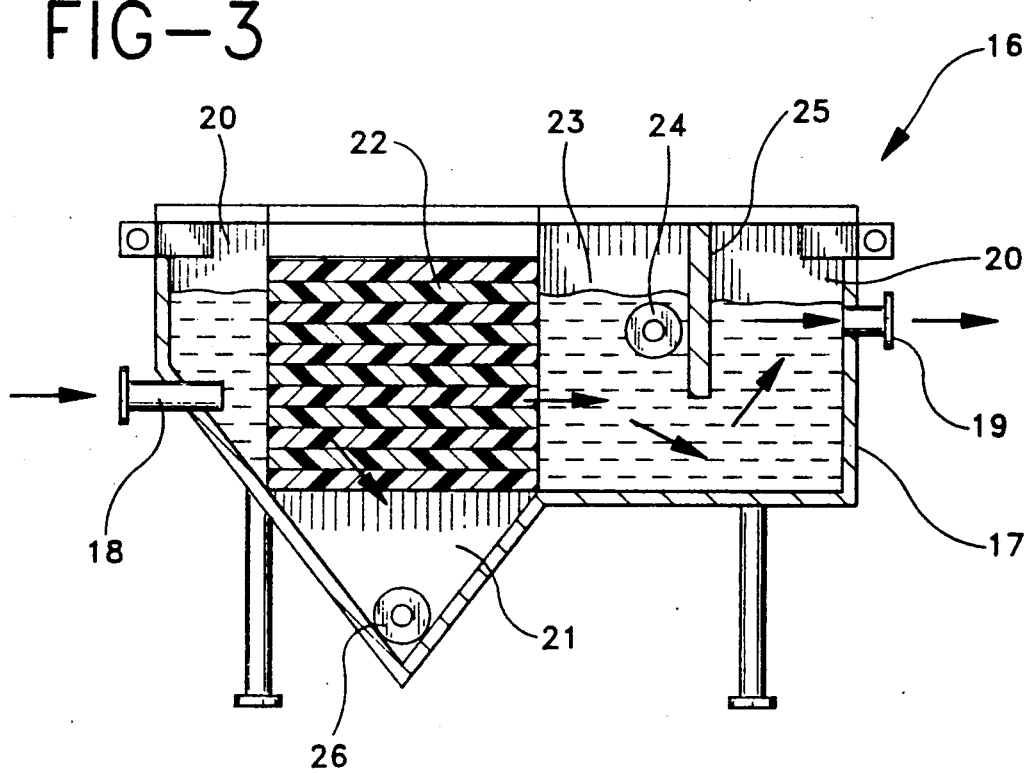

SYSTEM FOR TREATING COMMERCIAL WASTE EFFLUENTS

FIELD OF THE INVENTION

The invention relates to a system for treating or otherwise purifying waste water effluents so that they can be discharged, and more particularly an effluent waste stream treatment system for removing fats, oils, greases, solids, particulate, heavy metals, and other contaminants from commercial and industrial effluents in order to render them environmentally acceptable.

BACKGROUND OF THE INVENTION

In recent times, the Environmental Protection Agency has instituted rigid requirements for discharging or otherwise disposing of wastes into the environment. Commercial effluents, such as laundry waste water contain a variety of contaminants that can no longer be discharged into public sewers or fed to sewage treatment facilities.

State and local environmental protection agencies have adopted the federal standards, and in many cases, have even surpassed them. Therefore, it has become necessary for local industries to purify their waste water, or risk heavy fines and operating restrictions.

Among the industries most susceptible to the new regulations are the commercial laundries, whose waste effluents are particularly afoul with contaminants such as fats, oils, greases, heavy metals, dirt, particulates, solids, etc. By their very nature, laundry effluents accumulate and concentrate these contaminants, and laundry waste water is particularly monitored and regulated by the environmental authorities.

In the past, commercial, industrial and institutional cleaning establishments removed oils and greases from textiles by applying detergents. The waste water was then discharged to the sewer or treated in extreme cases when necessary.

While this method of laundering textiles and discharging laundry waste water effluents was adequate for those times, it no longer provides a viable cleaning and discharging procedure. The extremely high standards presently imposed on the allowable contaminants in the discharged waste water, cannot usually be met utilizing the aforesaid procedure.

Also, one of the major drawbacks of the prior method of processing the effluent, was that it was essentially a batch process. The process was very slow. The effluent had to remain for an extended period of time within large holding tanks for the FOGs to rise out of solution, before skimming could be performed. Various mechanical and chemical means where utilized to froth or foam the demulsified contaminants contained in the waste water, in order to assist in their rise to the top surface of the tank. More often than not, the foaming and frothing additives, where themselves undesirable contaminants that leached into, and polluted the dischargeable waste water.

In all, the previous procedure was generally costly, and inefficient.

The present invention, while particularly applicable to laundry waste effluent purification, can be applied to most any type of industrial waste water management problem.

The current invention can be used to treat waste effluents in car washes, truck wash facilities, oil dealer establishments, airplane washing operations, garages, as well as commercial, industrial and institutional laundries.

The process of this invention is not heavily dependent upon time and/or gravity to separate the emulsion, as was necessary in the aforementioned prior art procedure. Rather, the invention chemically breaks down the emulsion to release and disperse the FOGs in the water phase. The effluent is acidified to cause splitting of the alkaline emulsion, and dispersion of the FOGs within the water. The acidified effluent is then fed through a coalescer, where the FOGs are adsorbed upon an appropriate surface, e.g. a plate or lipophilic material, such as a PVC or polypropylene media pack. The oil molecules rapidly coalesce and gather upon this surface to form droplets. The oil droplets quickly rise to the top of the effluent stream where they are syphoned off and/or pumped away.

One of the major advantages of the invention is that the treatment method can be performed as a continuous process, thereby eliminating the need for large holding tanks, and time consuming effluent holding and storage procedures. Also, harmful and expensive foaming and frothing agents are not employed in this process.

SUMMARY OF THE INVENTION

In accordance with the present invention, there is provided a system for treating commercial, industrial and institutional effluents to remove contaminants such as: fats, oils and greases, (FOGs) from waste water. The system generally features a continuous processing treatment of the effluent, but can also be adapted on a small scale to a batch procedure. The system comprises the feeding of an emulsified waste stream to a first screening station disposed along a waste water effluent feed path. The solid matter and large particulates are removed at the first screening station. The FOGs in the waste stream are initially emulsified during the laundering or cleaning process by an alkaline detergent. The screened, alkaline, emulsified waste stream is then fed to a first stage of a pH adjustment station. Here, the emulsified FOGs begin the process of being released and dispersed within the fluid, through the downward adjustment of the pH, i.e. by treating the effluent with acid. Actually, the acidification of the effluent, and dispersion of the FOGs is achieved in a two stage process. At a certain acid pH level, usually achieved during the second pH adjusting stage, the alkaline emulsion will be caused to split. The splitting of the emulsion then causes release and dispersion of the FOGs. The dispersed emulsion stream is then fed to a second screening station, where fine particulates are removed, leaving the stream free of particles greater than approximately twenty to fifty microns. Additional filtering can be used after this stage to reduce the particulates to around 20 microns. An air sparger or bubbler introduces air or gas into the water to aid in the agglomeration of the FOGs. Next, the effluent stream is fed to the second stage of the pH adjustment station to adjust the pH to the necessary dispersion level. Finally, the dispersed emulsion stream is introduced into a separation station comprising either a separator, coalescer, clarifier or combination thereof. In the separation station, the fats, oils and grease, and any remaining solid waste is separated from the aqueous phase, syphoned off and/or pumped away. The waste water is now in condition to be discharged into the sewer system. Other processing can subsequently be done, such as environmental pH adjustments, or the removal of other contaminants such as heavy metals.

BRIEF DESCRIPTION OF THE DRAWINGS

A complete understanding of the present invention may be obtained by reference to the accompanying drawings, when considered in conjunction with the subsequent detailed description, in which:

FIG. 2 is a top view of a coalescing apparatus disposed within the separation station, illustrated in FIG. 1; and FIG. 3 is a front view of the coalescing apparatus shown in FIG. 2.

For purposes of brevity and clarity, like elements will bear the same designations throughout the figures.

DESCRIPTION OF THE PREFERRED EMBODIMENT

Figure 1:
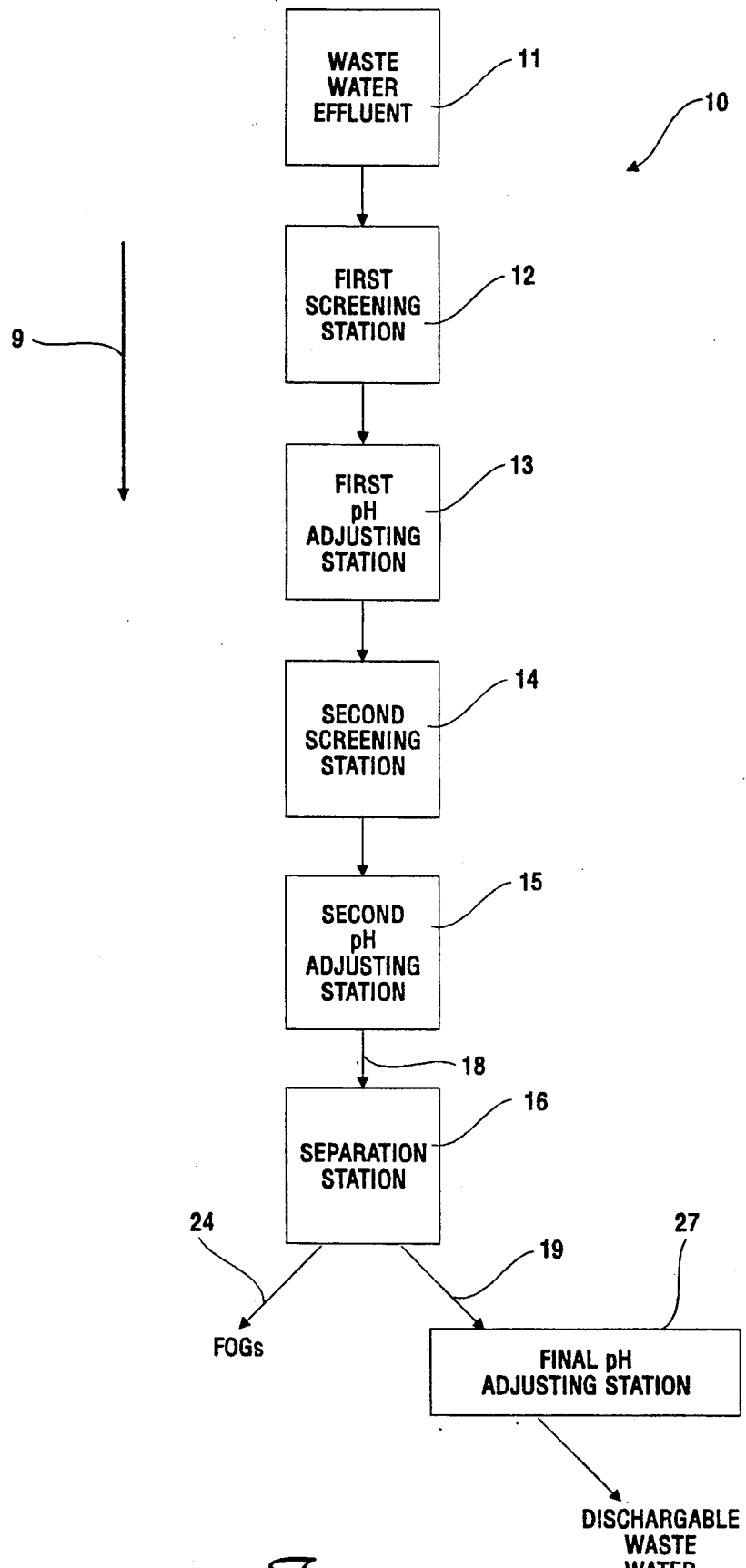
FIG. 1 represents a block, flow diagram of the treatment facility utilized to decontaminate commercial waste streams in accordance with this invention.

Generally speaking, the invention pertains to the purification of commercial, industrial, and institutional waste streams in order to bring them into dischargeable compliance with environmental standards. The invention provides a system for removing contaminants, such as FOGs, from waste effluents on a essentially continuous basis. During the treatment process, the FOGs disposed within the textiles to be cleaned, are treated with an alkaline detergent, causing their emulsification. The effluent waste stream is then treated by removing the solids and particulates. The alkaline emulsion is split by acidification of the waste water, thus releasing and dispersing the FOGs. The waste stream is then fed to a separation station, where the oils are adsorbed on an appropriate surface, such as a plate or lipophilic media pack. The oil molecules form droplets that rise to the surface and are syphoned off and/or pumped away. The waste water is then dischargeable to the Public Owned Treatment Works (POTW) after a final pH adjustment, that conforms the waste effluent to environmental regulations.

The subsequent description will be directed towards the purification of laundry effluents for the sake of preferred description. It should be understood, however, that the invention can be used for a wide variety of waste water management problems. The invention will also be described as a continuous process to which it is best suited. However, the system can be adapted for batch processing as is most practical in small cleaning establishments.

Now referring to FIG. 1, a block, flow diagram of the purification system 10 of this invention is illustrated, wherein various treatment stations are shown disposed along a waste water effluent feed path 9. Waste water effluent 11, which contains FOGs that have been emulsified with at least one alkaline, ethoxylated amine, of the type disclosed in U.S. Pat. No. 3,117,999, issued: Jan. 14, 1964, or disclosed in copending U.S. patent application, Serial No. 718730; filed herewith, is fed to a first screening station 12.

The first screening station 12 comprises a set of coarse mesh filters that are designed to remove lint balls, and any large foreign objects such as pencils, nuts, bolts, paper clips, etc., which may have been inadvertently left within any of the washed textiles. After the effluent has been filtered in screening station 12, it is fed to a first pH adjustment station 13. The pH adjustment station 13 comprises a metering pump for introducing acid into the effluent for adjusting the pH downward. The pH adjustment station 13 will also comprise a pH sensor connected to a controller, for controlling the metering pump, and a fluid control sensor and valve for controlling the amount of liquid passing through the system. An agitator may also be utilized at station 13 for mixing the acid into the effluent.

After the effluent pH has been reduced, the alkaline emulsion containing the FOGs will begin to split, thus releasing and dispersing the FOGs into the fluid. The splitting of the emulsion will be completed within the second pH adjustment station 15, where the pH will be reduced to a preferred range of approximately 1.5 to 4.5.

After the effluent has been treated in the first pH adjustment station 13, it is pumped to a second screening station 14. The second screening station 14 comprises a mechanically vibrated screen or screens, such as a multitiered shaker screen, manufactured by Sweco or Midwest Industries. The shaker has fine mesh filtering screens in the size range of approximately 20 to 325 mesh. The size and number of filtering screens is dependent upon the laundering process and the nature of the textiles being cleaned. For a standard industrial laundry, three screens ranging in size from approximately 60 to 200 mesh are adequate.

The fine screening is important, in that fine particulate are removed. It is possible to remove particles down to approximately twenty to fifty microns in size during this phase of the process, and down to approximately twenty microns with the aid of additional filtering disposed after station 15.

After the small particles have been removed, the second pH adjustment is accomplished at station 15, as aforementioned. Station 15 comprises the same components as the first pH adjustment station 13.

The fluid passing through the various pH adjustment stations 13 and 15, respectively, may be contained within various sized tanks to accommodate the amount of flow through the system. The tanks can be any suitable holding vessel that will not deteriorate from the introduction of alkaline and acid reagents. The holding vessels can comprise a concrete pit, stainless steel tank, an FRP lined tank, etc.

The split emulsion of station 15 is then transferred to a separation station 16. An air sparger or gaseous bubbler may be introduced between stations 15 and 16, respectively, in order to aid in the agglomeration of the FOGs. Also, an additional particle filter can be utilized at this stage of the process to reduce the size of the particulates to about 20 microns. The flow into station 16 is controlled and once inside station 16, the flow is laminar. The separation station 16 comprises either a separator, coalescer, clarifier or combination thereof. At this station, the FOGs are physically separated from the aqueous liquid. In the preferred embodiment, the invention utilizes a coalescer 17, Model No. 8201S, manufactured by Alcoa or Diamond Chemical, as illustrated in FIGS. 2 and 3. The coalescer 17 comprises an inlet 18, an outlet 19, and a holding tank 20 having a V-shaped mid-section 21. The effluent from station 15 is fed to the inlet 18 of the coalescer 17, where it enters holding tank 20. Above the V-shaped mid-section 21 of the holding tank 20 is disposed a coalescing pack 22. The effluent entering through inlet 18 is directed to the coalescing pack 22, where the FOGs adsorb onto the adsorbing pack surface. The coalescing pack 22 can comprise a convoluted sheet of PVC material or polypropylene. As the molecules of fat, grease and oil adsorb onto the surface of screen 22, where they coalesce and form droplets that quickly rise to the top of the liquid surface 23. The FOGs floating upon surface 23 are then syphoned off through oil drain 24. The oil drain 24 can comprise a pulp (not shown) for rapidly discharging the FOGs, if so required. The remaining aqueous fluid is forced under baffle 25 and out the outlet drain 19.

Any sludge or dirt still remaining in the effluent entering the inlet 18 of tank 20 is quickly eliminated during the adsorption of the FOGs upon the coalescing pack 22 and settles to the bottom of the V-shaped mid-section 21. The settled sludge is syphoned off through the sludge drain 26 disposed at the bottom of the V-shaped mid-section 21 of tank 20.

The FOGs leaving through oil drain 24 comprise as little as, or less than, 1.7% water, and are suitable as burnable fuel.

The waste water leaving through outlet 19 contains less than 100 parts per million of FOGs. The water leaving the tank 20 through outlet 19 can be passed to a final pH adjustment station 27 (FIG. 1), to bring the effluent into environmental regulation conformity, whereafter it is dischargeable waste water.

Since other modification and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the current invention, what is desired to be protected by Letters Patent is presented by the subsequently appended claims.

What is claimed is:

1. A method of purifying laundry-type waste water effluent containing fats, oils and grease (FOGs), said waste water effluent having been treated with an amine-based emulsifying detergent, said method purifying said waste water effluent for the purpose of discharging said waste water effluent, said method comprising:
   (a) removing solid materials from waste water effluent;
   (b) acidifying the waste water effluent to initiate release and dispersion of emulsified FOGs from said waste water effluent; and
   (c) separating said released and dispersed FOGs from an aqueous phase of said waste water effluent by coalescing said FOGs, whereby said waste water effluent will be purified for discharge to the environment.

2. The method of claim 1, wherein said separating step (c) further comprises the step of:
   (d) coalescing said FOGs upon a lipophilic surface to physically separate said FOGs from said aqueous phase of said waste water effluent.

3. The method of claim 1, wherein said removing step (a) further comprises the step of:
   (d) removing both coarse and fine materials from said waste water effluent.

4. The method of claim 1, further comprising the step of:
   (d) final adjusting said pH of said waste water effluent after said separating step (c), so that said waste water effluent conforms to environmental regulations.

5. The method of claim 1, wherein said waste water effluent is alkaline by reason of having been treated with an emulsifying, alkaline detergent.

6. The method of claim 1, further comprising the step of:
   (d) introducing gaseous bubbles into said waste water effluent to provide agglomeration of said FOGs.

7. The method of claim 1, further comprising the step of:
   (d) filtering particles from said waste water effluent prior to the separating step (c).

* * * * *